United States Patent [19]

Heatherly

[11] 4,259,042
[45] Mar. 31, 1981

[54] CONFECTIONARY PUMPS

[75] Inventor: Lawrence E. Heatherly, Colona, Ill.

[73] Assignee: H & P Pump Company, Port Byron, Ill.

[21] Appl. No.: 74,000

[22] Filed: Sep. 10, 1979

Related U.S. Application Data

[63] Continuation-in-part of Ser. No. 034,290, Apr. 30, 1979.

[51] Int. Cl.³ .............................................. F04B 21/02
[52] U.S. Cl. .................................... 417/566; 417/569
[58] Field of Search ....................... 366/173, 174, 176; 137/854; 417/566, 570, 571

[56] References Cited

U.S. PATENT DOCUMENTS

| | | | |
|---|---|---|---|
| 2,138,605 | 11/1938 | Landis | 417/566 |
| 2,397,281 | 3/1946 | MacEwing | 366/176 |
| 2,537,742 | 1/1951 | Collins | 417/571 |
| 2,747,609 | 5/1956 | Sekera | 137/854 |
| 2,777,464 | 1/1957 | Mosely | 137/854 |
| 3,485,419 | 12/1969 | Taylor | 417/566 |
| 3,527,551 | 9/1970 | Kutik et al. | 417/566 |
| 3,664,774 | 5/1972 | Tupper et al. | 417/560 |
| 3,730,217 | 5/1973 | Gute | 417/566 |
| 3,787,145 | 1/1974 | Keyes | 417/503 |
| 3,829,242 | 8/1974 | Duke | 417/566 |
| 3,898,866 | 9/1974 | Keyes | 62/306 |
| 4,018,545 | 4/1977 | Knedlik | 417/503 |
| 4,084,606 | 4/1978 | Mittleman | 417/566 |
| 4,084,731 | 4/1978 | Ayres | 417/566 |

FOREIGN PATENT DOCUMENTS

| | | | |
|---|---|---|---|
| 1383097 | 11/1964 | France | 417/571 |
| 1417355 | 10/1965 | France | 137/854 |

*Primary Examiner*—William L. Freeh
*Attorney, Agent, or Firm*—Glenn H. Antrim

[57] ABSTRACT

A piston pump for mixing air into a liquid confectionary mixture uses resilient, duck-bill shaped valves in special valve bodies to provide efficient operation, easy assembly and disassembly, and easy cleaning. In one embodiment, a duck-bill valve in a central outlet passageway of a valve body functions as an outlet check valve and has an integral resilient disk portion that fits over a face of the valve body to function as a check valve for a plurality of spaced inlet passageways. In another embodiment, a duck-bill valve within an end of a cylinder of a pump is placed over a central inlet passageway, and a spool with circumferentially spaced holes is positioned about the duck-bill valve to aid in mixing confectionary mixture and air. A separate duck-bill valve as a check valve is positioned in an outlet passageway. By using only duck-bill valves in this embodiment, fruit pulp and seeds in confectionary mixtures can be readily pumped and mixed simultaneously without plugging the valves.

4 Claims, 10 Drawing Figures

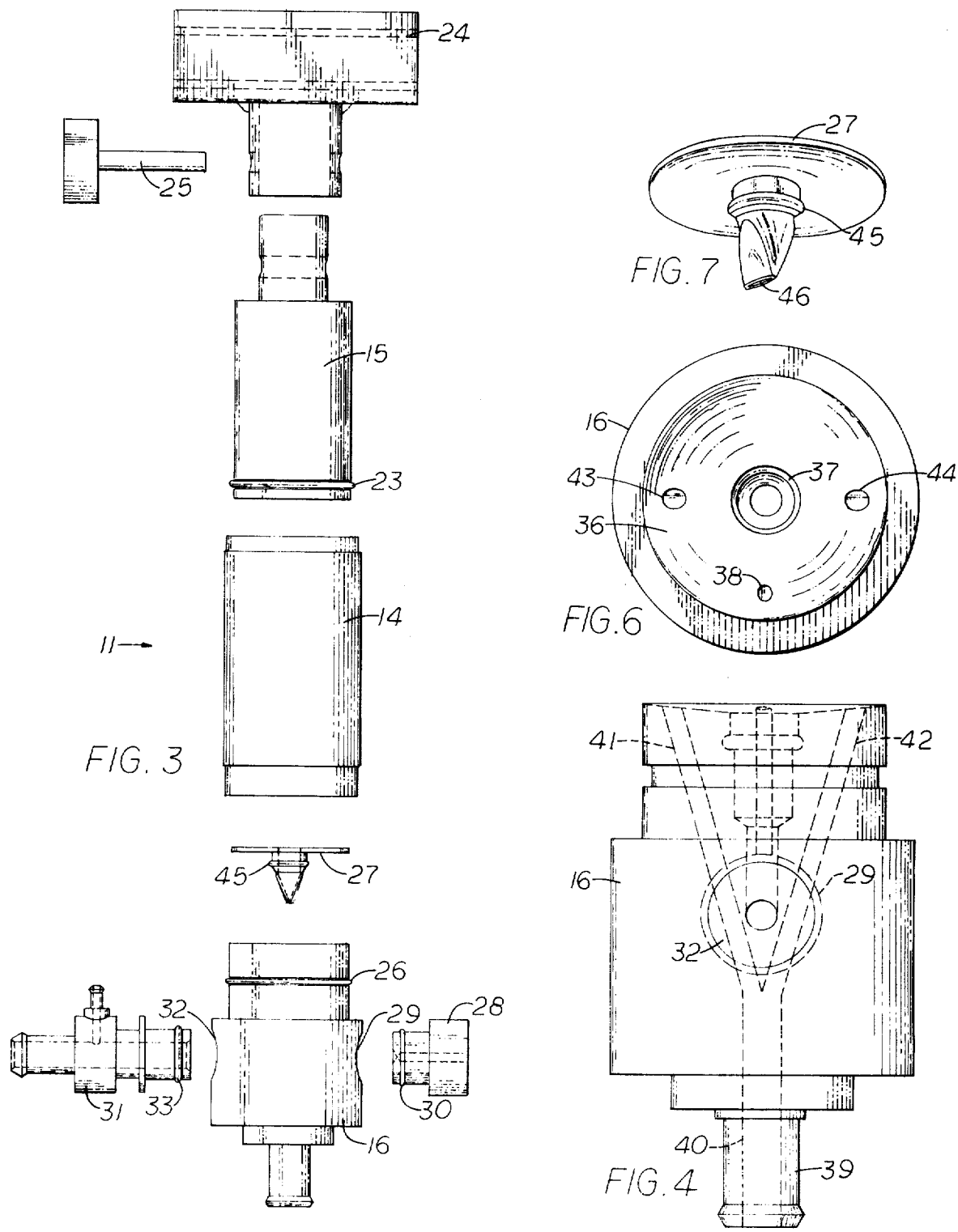

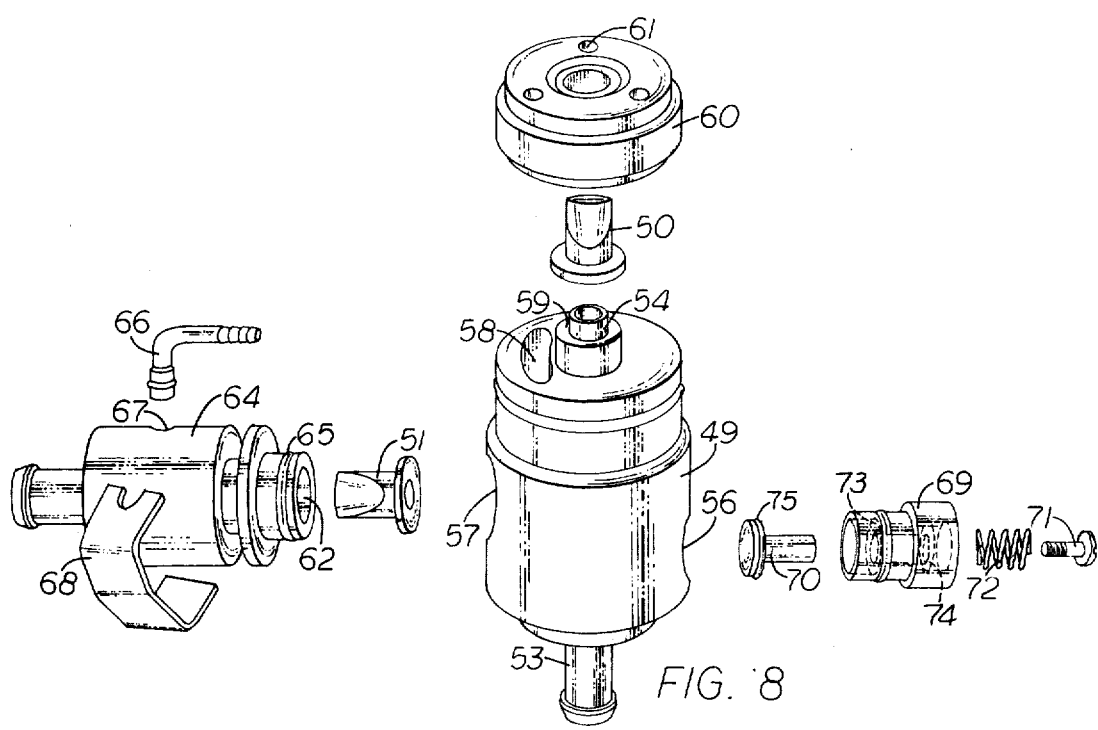
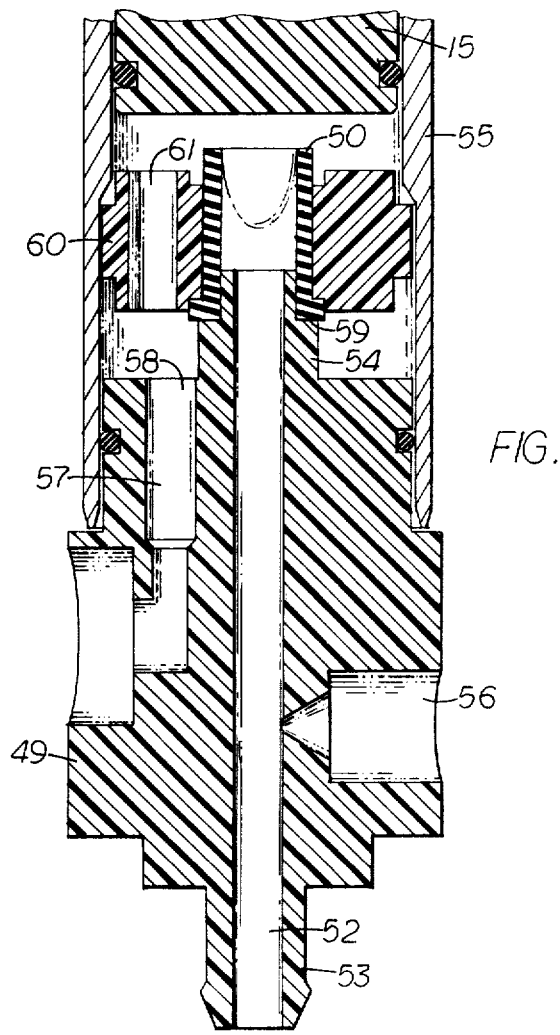
FIG. 8
FIG. 9

CONFECTIONARY PUMPS

BACKGROUND OF THE INVENTION

This is a continuation-in-part of application Ser. No. 034,290 filed Apr. 30, 1979.

This invention relates to piston pumps of the type for mixing air and liquid confectionary mixture and for pumping the resulting mixture into a freezing chamber, and particularly to pumps having valves of the duck-bill type that are easily cleaned and that are not plugged by fruit pulp and seeds.

Dispensers for soft ice cream have pumps for drawing simultaneously liquid confectionary mixture and air into respective chambers where mixture and air are mixed in desired proportions. The pumps then function to discharge confectionary and air mixture into freezing chambers. For example, in U.S. Pat. No. 3,829,242 issued to Gene S. Duke and the present inventor on Aug. 13, 1974, air and liquid are drawn through passageways controlled by one flexible valve member, and a resulting mixture is forced into a freezing chamber through a check valve having a flexible band. To obtain pressure in the freezing chamber within a desired range, the operation of the pump is controlled by an electric switch responsive to change and pressure within the freezing chamber as reflected at the outlet of the pump.

Pumps for confectionary mixture must be easily disassembled and cleaned. A minimum number of simple parts decreases costs of manufacturing and facilitates cleaning.

SUMMARY OF THE INVENTION

A pump according to the present invention is the type that mixes air into confectionary liquid mixture within the cylinder of the pump. As a piston of the pump is moved in a direction away from a valve body, air and the liquid mixture are drawn through one or more passageways within the valve body. During a succeeding stroke of the piston, the mixture is forced into a freezing chamber through another passageway within the valve body. Disassembly and cleaning of valve assemblies according to the present invention are facilitated in that the valve bodies are easily removed from the respective cylinders of the pumps, and the valves are easily removed from the valve bodies. In one embodiment, a single resilient valve having a duck-bill portion and a disk portion functions as a dual check valve in that it controls liquid and air inlets and an outlet. In another embodiment for pumping and mixing large amounts of fruit pulp and seeds without clogging, separate duck-bill valves are used, the valve used for an inlet valve being within an end of the cylinder of a pump and surrounded by a spool with holes to aid in mixing.

The valve body of the embodiment having a single flexible member as a valve has a seat facing into the cylinder. The seat is preferably slightly conical such that it slants upwardly at a small angle with respect to a radial direction from a central opening or outlet to its periphery. A center opening through the valve seat is an outlet. An inlet for liquid mixture divides within the valve body into two passageways having through the seat respective openings adjacent the center and spaced from each other, and an air inlet has another spaced opening through the seat. A hollow stem of the duck-bill portion of the single valve is to fit tightly into the outlet, the disk-shaped portion about the stem of the valve normally extends perpendicularly from the stem. When the stem is pressed tightly into place within the central opening, the resilient disk-shaped portion acquires the inclination of the conical face of the seat to fit tightly thereover. The disk-shaped portion of the valve therefore seals simultaneously the two inlets for the liquid mixture and the inlet for air. The duck-bill check valve at the lower end of the hollow tube or stem is normally closed by pressure of fluid within the freezing chamber and is opened when the pressure within the cylinder of the pump becomes greater than the pressure in the freezing chamber. Various types of pumps have umbrella valves for controlling flow, but the upper portion is curved rather than being flat like a disk, and therefore is not effective normally to provide a seal between a plurality of inlet openings through the face of a valve body.

In the other embodiment that has two duck-bill valves for readily passing fruit pulp and seeds, the opening through the center of the face of the valve body is an inlet. The face of the valve body rather than being conical as described above is generally in a plane and has an axial, projecting tubular portion that is at the inner end of the inlet passageway. A duck-bill valve is placed over the tubular end of the inlet passageway, the converging portions controlling the valve facing into the cylinder. A spool having spaced holes is positioned about the stem of the inlet valve around the projecting tubular portion and spaced above the end of the valve body. As a piston approaches the valve body, a mixture of liquid and air is forced through the holes of the spool into a space between the spool and the end of the valve body and into an outlet passageway within the valve body. The outlet passageway has in the end of the valve body spaced from the center of the valve body an oval opening adjacent the tubular portion. The other end of the outlet passageway opens through the side of the valve body and is adapted to receive a valve housing for a duck-bill valve that functions as a check valve in the outlet.

BRIEF DESCRIPTION OF THE DRAWING

FIG. 3 is an exploded view of the cylinder and valve assembly of FIGS. 1 and 2, the valve assembly having a single flexible member functioning as valves for all input and output outlets;

FIG. 4 is a side view of the valve body shown in FIG. 3;

FIG. 6 is a view of the top of the valve seat of the valve bodies of FIGS. 4 and 5;

FIG. 7 is a perspective view of a flexible valve that fits over and into the valve seat of FIG. 6;

FIG. 8 is an exploded view of a valve body and two duck-bill valves, this embodiment being particularly suitable for pumping and mixing confections with substantial fruit pulp and seeds;

FIG. 9 is a cross-sectional view of the valve body of FIG. 8; and

DESCRIPTION OF THE PREFERRED EMBODIMENTS

Figure 1:
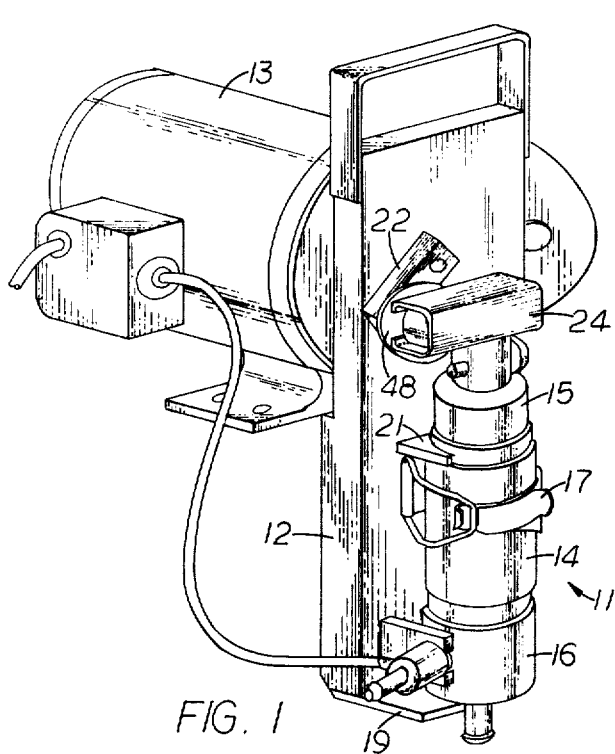
FIG. 1 is a perspective view of a pump according to this inventin assembled to its bracket and connected to a driving motor.

In FIG. 1, a pump assembly 11 is shown secured by a bracket 12 to the end of a housing of an electric motor 13. The pump 11 comprises namely a cylinder 14, a piston 15 within and extending from an upper end of the cylinder, and a cylindrical valve body 16 having an upper portion within the lower end of the cylinder 14. The cylinder 14 is preferably fabricated from stainless steel, and the piston 15 and valve body 16 from acetal resin plastics approved for food products.

Figure 2:
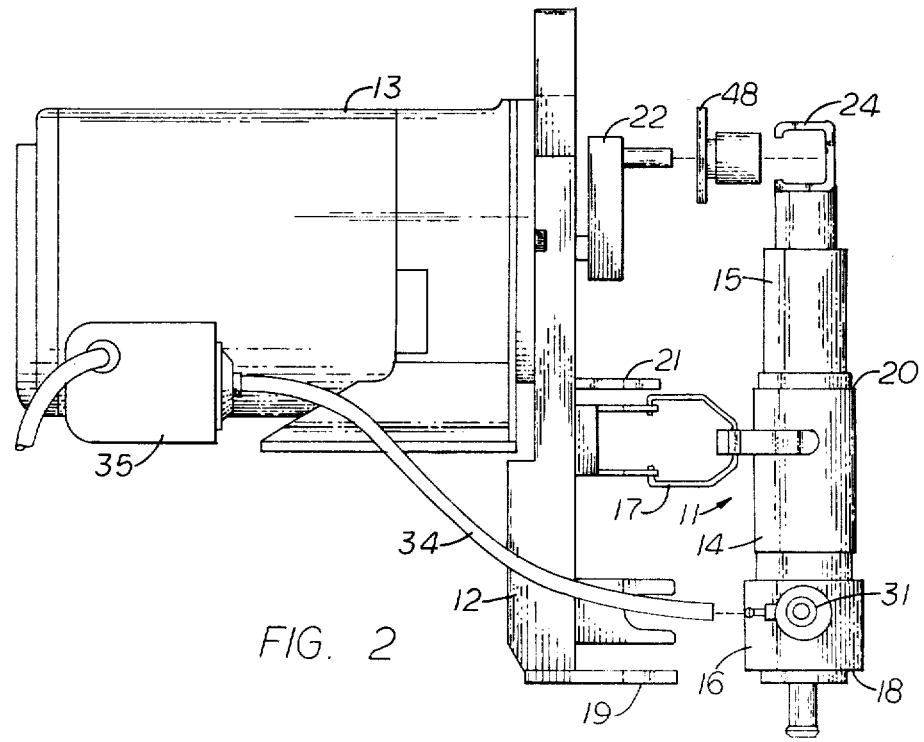
FIG. 2 is a side view of the assembly of FIG. 1 with the pump removed from its bracket.

The pump assembly 11 can be readily removed from the bracket 12 and disassembled without the use of tools. A two-piece clamp 17 extends forwardly from the bracket 12 and clamps about the middle of the cylinder 14. With reference to FIG. 2, the cylinder 14 and the valve body 16 are held together by two shelf-like, spaced projections 19 and 21 projecting from the face of the bracket 12. The lower bracket 19 has an outwardly facing, arcuate recess for receiving a lower portion of the valve body 16 below and adjacent to a lower shoulder 18, and in a similar arrangement, the upper projection 21 has an outwardly facing recess for receiving the upper end of the cylinder 14 above and adjacent to a shoulder 20. For reciprocation, the upper end of the piston 15 is connected to a crank 22, the crank being connected to an output shaft of the motor 13.

To remove the pump assembly 11 from the bracket 12 as shown in FIG. 2, a piece of tubing 34 of an electric control switch 35 is disconnected from the smaller one of two nipples on a fitting 31. The clamp 17 is the type that snaps either closed or open after a lever is moved past a center position. After the clamp 17 has been snapped open, the pump assembly 11 can be moved straight outwardly to disengage the shoulders 18 and 20 from the respective shelves 19 and 21 and to remove a channel follower 24 connected to the piston 15 from a pin that extends outwardly from a crank 22.

The pump assembly 11 is easily disassembled as shown in FIG. 3 by pulling in opposite directions on adjacent parts. Removal of the piston 15 from the cylinder 14 exposes an O-ring 23 that is retained in a circumferential groove near the lower end of the piston. The O-ring 23 that may be fabricated from neoprene functions as a seal between the piston 15 and the inner wall of the cylinder 14. The upper end of the piston 15 is reduced in size to provide a stem that fits in a lower tubular portion that extends perpendicularly from the center of the channel of the channel follower 24. When the tubular portion of the channel follower 24 is in place on the stem of the piston 15, a plastic pin 25 is inserted through holes that are aligned through the tubular portion and the stem. Removal of the valve body 16 from the cylinder 14 exposes an upper portion, of suitable diameter to be a sliding fit within the cylinder 14, and an O-ring 26 in a circumferential groove about in the middle of the upper portion. A resilient valve 27 that is described in detail below is easily removed from the top of the valve body 16. A plug 28 for an air orifice is removed from a bore 29 within the wall of the valve body 16. The outer end of the plug 28 is a head for a stop, and the inner end of smaller diameter has a groove for retaining a circumferential O-ring to fit tightly within the bore 29. A plug having an orifice or required diameter is selected to meter a desired flow of air.

A fitting 31 is removable from a bore 32 that is diametrically opposite from the bore 29. For connecting two pieces of tubing to the output of the pump, the fitting 31 has two nipples. An O-ring 33 near an inner end of the fitting is a proper size to fit tightly within the bore 32.

Figure 5:
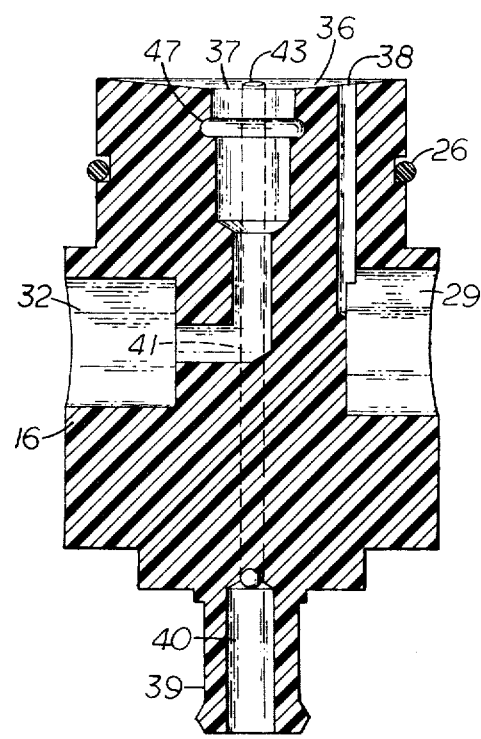
FIG. 5 is a longitudinal, cross-sectional view of the valve body of FIG. 4 as rotated through 90 degrees.

The valve body 16 is shown in more detail in FIGS. 4-6. The upper face of the valve body is a seat 36 for receiving the resilient valve 27 of FIG. 7. As shown most clearly in FIG. 5, a passageway for the fitting 31 of the outlet extends radially from the bore 32 to the center of the valve body 16 and then axially upwardly to terminate in an opening 37 in the center of the valve seat 36. Another smaller passageway for air to be drawn through a small orifice of the plug 28 extends from the inner end of the bore 29 upwardly to an opening 38 that is on the valve seat 36 at a position about midway between the central opening 37 and the periphery of the valve seat. A piece of tubing for liquid mix is to be connected to a nipple 39 that extends axially downwardly from the valve body 16. A passageway 40 extends through the nipple upwardly partway through the valve body 16 and then divides into two smaller passageways 41 and 42 (FIG. 4) to terminate in respective openings 43 and 44 (FIG. 6) in the valve seat 36. These openings 43 and 44 are preferably approximately circumferentially positioned with respect to the opening 38 and spaced at equal distances therefrom.

In order that the disk portion of the resilient valve 27 fits tightly against the face of the seat 36, the angle of the face of the seat 36 with respect to the axial passageway through the seat is somewhat different from the angle between the disk of the valve 27 and the axis of the tubular portion. As shown most clearly in FIG. 5, the seat 36 is slightly conical for it slants downwardly, preferably at an angle within a range of 5 degrees to 15 degrees, from its outer edge to the central opening 37. Before the resilient valve 27 is installed, the portion resembling a disk is perpendicular to the axis of the tubular portion. Different degrees of slant from a radial direction might be used for the seat and the valve such that the periphery of the valve contacts the seat first while the valve is being assembled on an axial line. A resilient ring 45 (FIG. 7) is spaced about the tubular portion of the valve 27 a short distance from the disk of the valve and may be a separate O-ring, but is preferably an integral part of the valve 27. Starting a short distance below the ring 45, the tubular portion terminates in two slanting, opposite, portions resembling a duck's bill and having a slit 46 between the opposite portions where they come together. Since the slanting portions are resilient, this lower end of the valve 27 functions as a check valve. During assembly, the tubular portion of the resilient valve 27 is positioned through the opening 37, and the center of the valve 27 is pressed downwardly until the ring 45 snaps into a groove 47 (FIG. 5) within the inner wall of the axial passageway to hold the disk of the valve 27 tightly against the seat 36. Since the disk of the valve 27 is forced upwardly at a small angle to conform with the slanting face of the seat 36, the disk fits closely over the face of the seat to cover tightly the inlet openings 38, 43, and 44.

The piston 15 is driven from the output shaft of the electric motor 13 through a follower-and-channel arrangement such that only the vertical component of the movement of the crank 22 is applied to the piston 15. With particular reference to FIG. 2, the end of the crank 22 opposite the drive shaft has a pin that rotatively fits into an axial bore through a channel roller 48. One end of the roller 48 is a cylinder of required dimensions to fit within the channel of the follower 24, and the other end has a greater diameter and is relatively thin to function as a washer between the arm of the crank 22 and the follower 24. A groove between the two portions receives the turned-in edges of the channel follower 24. The cylindrical portion of the channel roller 48 is positioned within the channel portion by aligning the turned-in edges of the channel portion and the groove and inserting the roller portion into the end of the channel portion. Then the piston 15 is extended a required distance from the cylinder 14 according to the position of the crank 22, and the pin of the crank 22 is inserted into the axial opening of the channel roller 48 as the pump assembly 11 is pressed into place between the shelves or projections 19 and 21 of the bracket 12. A piece of tubing 34 connected to an electric switch 35, that operates in response to pressure changes, is connected to a small nipple in the wall of the fitting 31, and a piece of larger tubing from the input of a freezing chamber is connected to the larger, coaxial nipple of the fitting 31. Another piece of tubing is connected to the lower nipple 39 of the valve body 16 for insertion into a container of confectionary mixture.

When the pump is in operation, the amount of air added to the confectionary mixture depends on the diameter of the aperture coaxially through the center of the plug 28. As the piston 15 moves upwardly, the suction raises the outer portion of the disk of the resilient valve 27 for permitting mixture to flow up a passageway 40 (FIG. 4) and through the branches 41 and 42 and from openings 43 and 44 (FIG. 6) below the raised edge of the disk of the valve 27 into space within the cylinder 14. Simultaneously, air flows through the orifice of the plug 28 and out the opening 38 that is also below the raised disk of the valve 27. The placement of the openings 38, 43 and 44 facilitates mixing within the cylinder 14. When the piston 15 is driven downwardly, the disk of valve 27 closes the openings 38, 43 and 44, and the pressure within the cylinder 14 becomes greater than the pressure in a freezing chamber that is connected to the fitting 31 such that the resilient lips at the bottom of the valve 27 opens to permit flow from the cylinder 14 into the freezing chamber. As the piston again reverses its direction of travel, the pressure from the freezing chamber through the fitting 31 becomes greater than the pressure above the valve 27, and the lower lips of the valve are pressed together to close the slit 46 (FIG. 7) for preventing reverse flow of the mixture.

The switch 35 is a conventional switch responsive to pressure and has a controlling switching circuit connected in the power lead of the electric motor 13. As the pressure at the output of the pump exceeds a maximum setting of the switch, pressure is supplied from the fitting 31 through the tubing 34 to a diaphram of the switch 35 to open the switch. Likewise, in a usual manner, when the pressure drops below a minimum setting as determined by the amount of liquid mixture in a freezing chamber, the switch 35 operates to close the electric circuit to the motor 13.

Although present pumps having various types of valves function quite satisfactorily for mixing and pumping smooth confectionary mixtures, the valves become plugged and the pumps become inoperative when the mixture has substantial amounts of pulp and seeds. Observation of the operation of a pump having the valve 27 of FIG. 7 shows that mixtures having substantial amounts of pulp and seeds were passed readily through the duck-bill portion of the valve 27 and that the valve continued to function satisfactorily as a check valve. A pump similar to the pump shown in FIGS. 1-3 but having a valve assembly of FIG. 8, having a valve body 49 in place of a valve body 16 as shown in FIG. 3, operates satisfactorily not only on smooth confectionary mixtures but on mixtures having pulp and seeds.

Compared with the valve assembly shown in FIG. 3, the valve assembly of FIG. 8 has the inlet and outlet passageways arranged differently and uses two duckbill valves 50 and 51 for the inlet and outlet respectively in place of the unitary valve 27 of FIG. 3. An inlet passageway 52 as shown most clearly in FIG. 9 extends from a lower coaxial nipple 53, corresponding to the nipple 39 of FIG. 5, coaxially straight through the valve body 49. An upper end of the valve body 49 fits into a lower end of cylinder 55 that has outside dimensions similar to the dimensions of the cylinder 14 of FIG. 3. The upper end of the valve body 49 has a coaxial tubular projection 54 for continuing the upper end of the inlet passageway 52 above the surrounding upper end of the valve body 49. An air passageway 56 extends through the side of the valve body 49 radially to the liquid inlet passageway 52. An outlet passageway 57 for liquid and air mixture extends partway through the side of the valve body 49 and then turns upwardly to terminate in an oval opening 58 that is located adjacent to tubular projection 54 between the projection and the periphery of the valve body 49.

The tubular projection 54 at the upper end of the valve body 49 has an outward circumferential shoulder 59 that functions as a spacer for the duck-bill valve 50 and an encircling spool 60. The stem of the duck-bill valve 50 fits tightly over the upper end of the tubular projection 54 such that converging portions of the valve having an intermediate slit are over the upper end of the passageway 52. A central hole of the spool 60 has the required diameter for the spool to fit tightly about the stem of the valve 50 above the shoulder 59 of the tubular projection 54. The inside wall of the cylinder 55 about an upper shoulder of the spool 60 tapers inwardly in an upward direction to retain the spool. The spool 60 has circumferentially spaced about its central portion a number of holes 61, such as the three holes 61 shown in FIG. 8, communicating from the space immediately below the piston 15 to the space between the spool 60 and the valve body 49. As the piston 15 moves downwardly, liquid and air that has been drawn through the inlet passageways 52 and 56 respectively are thoroughly mixed by being forced through the holes 61 and into the space below the spool 60 before being forced through the oval opening 58 and the outlet passageway 57 to a freezing chamber.

Figure 10:
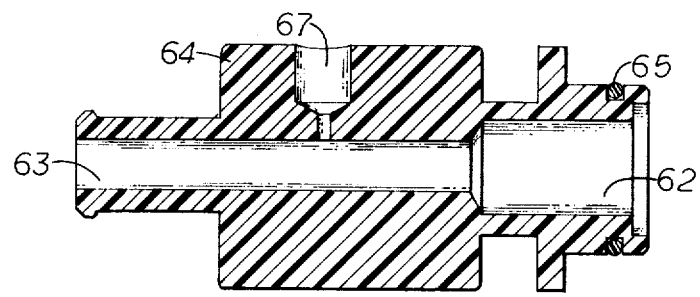
FIG. 10 is a cross-sectional view of a valve housing shown in FIG. 8 for use with a duck-bill valve in an outlet.

With reference to FIGS. 8 and 10, the outlet check valve 51 of the duck-bill type fits tightly into an enlarged hole 62 at the end of an axial passageway 63 through a valve housing 64. The converging portion of the valve 51 is inserted first and a shoulder on the opposite end rests against an end of the housing 64. The opposite end of the housing 64 functions like the fitting 31 of FIG. 3 to provide nipple for a hose to a freezing chamber and a hose 34 (FIG. 2) to the pressure switch 35. The end of the valve housing with the valve 51 has an encircling O-ring 65 and is inserted into an enlarged hole at the end of the outlet passageway 57 of the valve body 49. An L-shaped nipple 66 to which is to be connected the hose 34 has an O-ring on an end to be inserted into an enlarged opening of a radial passageway 67 that joins the axial passageway 63 of the valve housing 64. A U-shaped bracket 68 snaps tightly about the valve housing 64, one end of the bracket 68 having a notch that fits over a shoulder of the nipple that is inserted in the passageway 67 of the housing 64. The outer end of the valve housing 64 has a nipple for the hose that connects to a freezing chamber. Both the fitting 31 of FIG. 3 and the valve housing 64 of FIG. 8 have a circumferential groove for receiving a retaining bracket connected to the main supporting bracket 12 of FIG. 1.

As described above, the amount of air to be added to liquid mixture can be controlled by selecting a plug 28, as shown in FIG. 3, having an orifice of required diameter for metering a desired flow of air. Since the air inlet to the interior of the cylinder merely has to open to the atmosphere, the position of an inlet to the cylinder is not critical. As shown herein, air inlets for confectionary pumps are preferably placed in valve bodies to facilitate disassembly and cleaning. However, air inlets having proper size orifices for determining the amount of air and respective check valves could be placed directly through the walls of cylinders corresponding to the cylinder 55. Occasionally, pumps have had orifices and check valves in the heads of pistons.

In FIG. 8, a new valve within a plug 69 to be inserted in the valve body 49 is preferred. In this valve, a valve member 70 having a sleeve and a flange not only functions as a check valve, but also functions as an adjustable orifice to determine a desired amount of flow of air into the cylinder 55. The plug 69 has an axial passageway into which the sleeve of the valve member 70 is a sliding fit. Both ends of the passageway for the sleeve of the valve member 70 are enlarged as counterbores to provide an inner shoulder 73 at that end of the valve body 69 to be inserted into the valve body 49, and a shoulder 74 at the opposite end. The sleeve of the valve member 70 is inserted through an O-ring 75 and into the axial passageway of the plug 69, and a threaded portion of an adjusting screw 71 is inserted through a helical compression spring 72 and turned into an inside threaded portion of the sleeve of the valve member 70. The O-ring provides a seal between the flange of the valve member 70 and the shoulder 73. The inner end of the spring 72 fits against the shoulder 74 of the valve body 69, and the outer end of the spring bears against the head of the adjusting screw 71.

Therefore, as the adjusting screw 71 is turned inwardly, the O-ring 75 is pulled more tightly against the shoulder 73, and restricts to a greater extent the amount of air that is drawn into the cylinder 55 during the suction stroke of the piston 15. The valve member 70 is pulled inwardly a short distance, and air is drawn around the O-ring and the flange of the valve member 70. The diameter of the flange and the O-ring is somewhat less than the diameter of the opening in which they are positioned. In addition to the flow of air from the cylinder 55 back into the inlet passageway 52 being checked by the valve 50, the valve member 70 must function as a check valve to prevent venting the inlet passageway 52 during the compression stroke of the pump for if air were vented through the air passageway 56, the vertical column of liquid mixture in the inlet passageway 52 would return to its container during the compression stroke.

I claim:

1. A pump for confections comprising:
   a cylinder, a piston within said cylinder, driving means connected to said piston,
   a check valve assembly including a valve body, an inlet check valve, and an outlet check valve, one end of said valve body being tightly enclosed within an end of said cylinder,
   said valve body having an inlet passageway and an outlet passageway therethrough communicating respectively from outside said cylinder through said valve body and out respective openings in said one end thereof to space within said cylinder,
   said inlet check valve being a resilient duck-bill type having a tubular portion at one end thereof and a converging portion with an intermediate slit at the other end thereof, said tubular portion being fit tightly over said opening of said inlet passageway in said one end of said valve body,
   a perforated member as a partition within said cylinder extending from said tubular portion of said inlet check valve to said cylinder, said perforated member being spaced from said one end of said valve body to provide a mixing space therebetween, said outlet passageway having an opening through said one end of said valve body into said mixing space, said outlet check valve being positioned in said outlet passage to permit flow of fluid from said cylinder,
   an air passageway communicating from the atmosphere to space within said cylinder, and a check valve within said air passageway to check flow of fluid from said cylinder.

2. A pump as claimed in claim 1 wherein said air passageway extends through a side of said valve body partway through said valve body to connect to said inlet passageway, an adjustable check valve in said air passageway to prevent venting of said inlet passageway during compression strokes of said pump, a spring connected to said check valve to bias said check valve closed, and an adjusting member connected to said spring, said adjusting member being adjustable to determine the amount of bias applied to said check valve for metering the amount of air to be drawn into said cylinder.

3. A pump as claimed in claim 1 wherein said one end of said valve body has an axial tubular projection extending into said cylinder, said tubular projection being a continuation of said inlet passageway through said one end of said valve body, said opening of said inlet passageway being in an end of said tubular portion, and said tubular portion of said inlet check valve being fit tightly to said tubular projection of said valve body for fluidly connecting said inlet check valve to said inlet passageway.

4. A pump as claimed in claim 3 wherein said tubular projection is substantially in the center of said one end of said valve body, said tubular portion of said inlet check valve fits tightly about at least a portion of said tubular projection, said perforated member being a spool fitting closely within said cylinder and about said tubular portion of said inlet check valve, and said spool having a plurality of circumferentially spaced holes therethrough around said tubular portion of said inlet check valve.

* * * * *